United States Patent
Weisker et al.

[15] 3,696,954
[45] Oct. 10, 1972

[54] SIDE LOADING STACKER

[72] Inventors: Alexander Weisker, Easton; Raymond L. Smith, Jr., Southbury, both of Conn.

[73] Assignee: C & M Manufacturing Company, Inc., Bethesda, Md.

[22] Filed: April 13, 1970

[21] Appl. No.: 27,728

[52] U.S. Cl. ............................. 214/731, 214/750
[51] Int. Cl. ............................................. B66f 9/14
[58] Field of Search .......... 214/16.4, 16.42, 620, 621, 214/730, 731, 750

[56] References Cited

UNITED STATES PATENTS

| | | | |
|---|---|---|---|
| 3,150,787 | 9/1964 | Patrignani | 214/514 |
| 3,175,722 | 3/1965 | Paulssen | 214/16.4 A |
| 3,086,618 | 4/1963 | Christiansen | 214/620 |
| 3,232,465 | 2/1966 | Romine et al. | 214/730 |
| 2,647,647 | 8/1953 | Alimanestiano | 214/16.1 CB |
| 2,751,093 | 6/1956 | Theibault | 214/16.10 B |

FOREIGN PATENTS OR APPLICATIONS

| | | | |
|---|---|---|---|
| 966,227 | 8/1964 | Great Britain | 214/730 |
| 1,431,841 | 3/1964 | Germany | 214/16.4 A |

*Primary Examiner*—Gerald M. Forlenza
*Assistant Examiner*—Lawrence J. Oresky
*Attorney*—Littlepage, Quaintance, Wray & Aisenberg

[57] ABSTRACT

Forks are reciprocated through a carrier as the carrier moves laterally across a carriage. The carrier undergoes a motion similar to a storing or retrieving function. When no load is on the forks, the forks may be changed to serve racks to the right or the left of the stacker.

17 Claims, 9 Drawing Figures

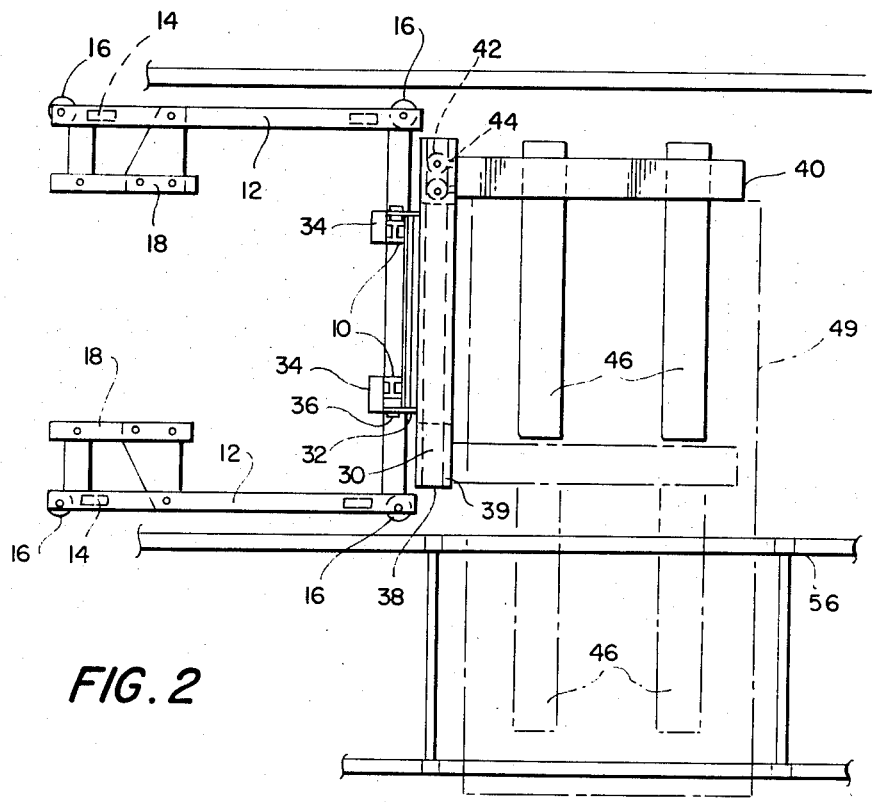
FIG. 2
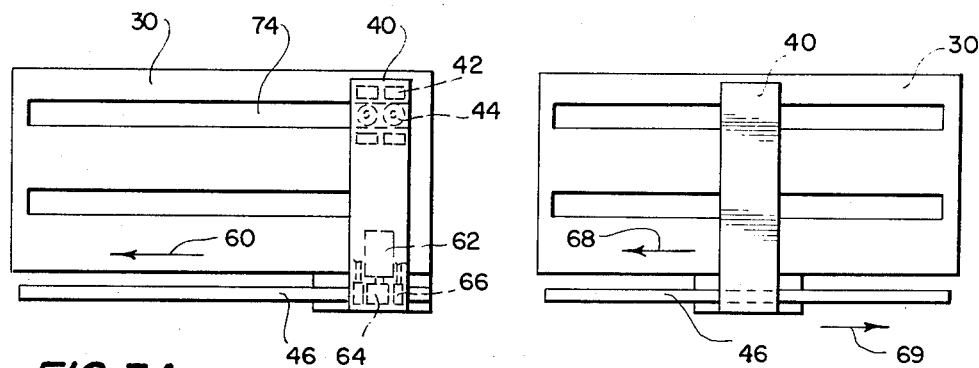
FIG. 3A
FIG. 3B
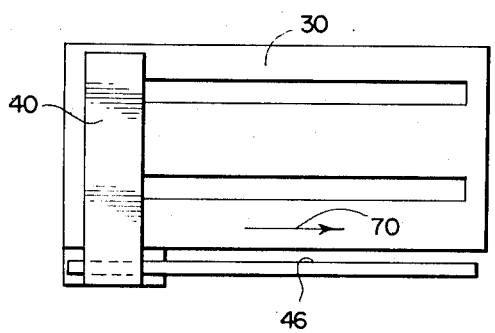
FIG. 3C
INVENTORS
ALEXANDER WEISKER
RAYMOND L. SMITH JR.

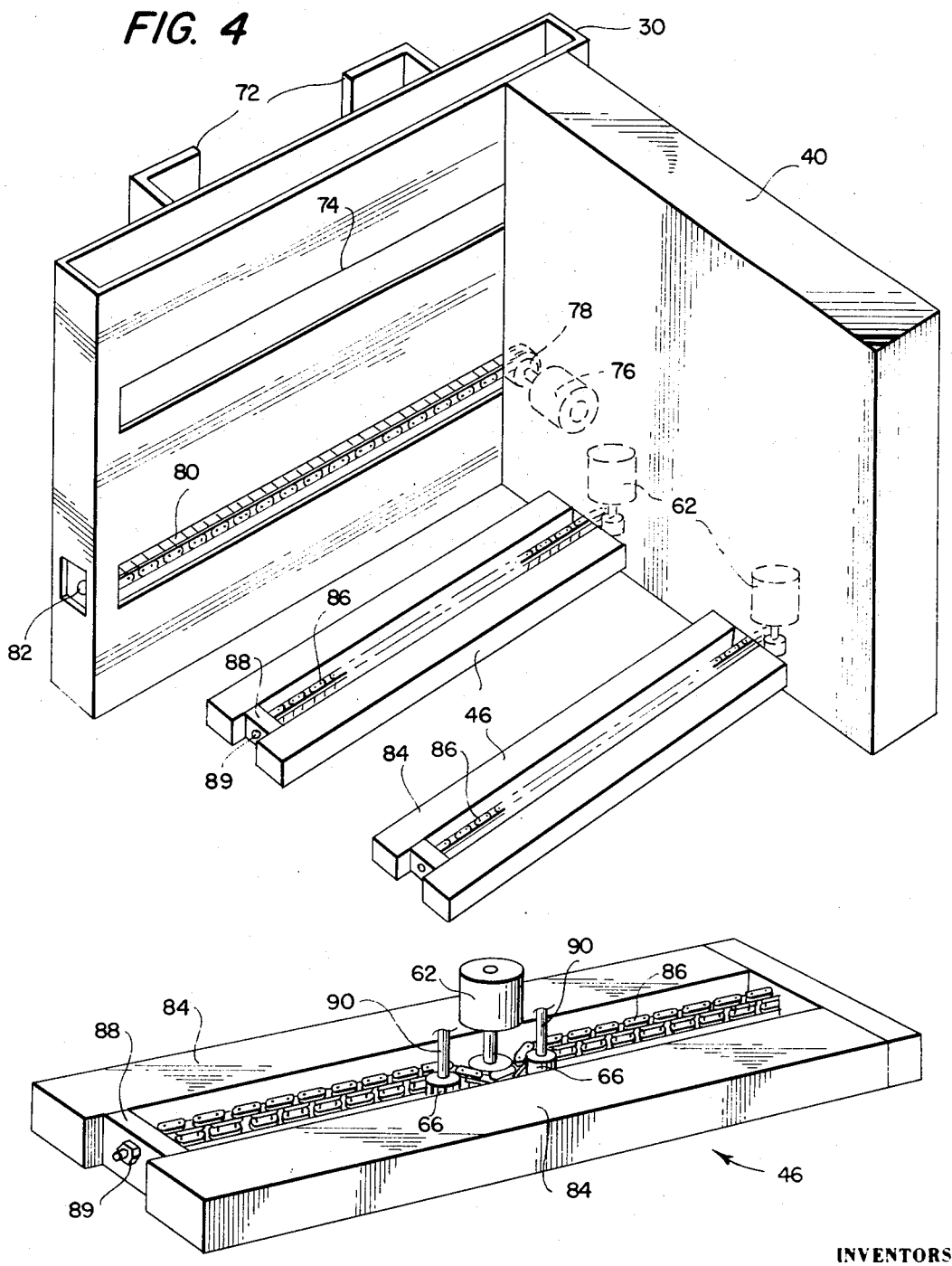

INVENTORS
ALEXANDER WEISKER
RAYMOND L. SMITH JR.

*Littlepage Quaintance, Wray & Aisenberg*

ATTORNEYS

SIDE LOADING STACKER

BACKGROUND OF THE INVENTION

Stackers are widely used in warehousing systems to insert and remove loads in storage racks. Normally, an aisle extends between two parallel racks, and a stacker moves along the aisle for carrying loads to a desired storage position or for picking up loads from a storage position. The stacker usually has a mast which is vertically mounted on a roller support which moves along overhead rails in the configuration of well known stacker cranes or which is supported on the floor in the configuration of well known stacker trucks. A carriage moves vertically on the mast for positioning opposite a storage location in a rack. A carrier which is mounted on the carriage moves toward the rack whereupon the carriage is slightly lowered or slightly raised depending upon whether the operation is a storage sequence or withdrawal sequence, and then the carrier is withdrawn from the rack.

BACKGROUND OF THE INVENTION

Stackers are widely used in warehousing systems to insert and remove loads in storage racks. Normally, an aisle extends between two parallel racks, and a stacker moves along the aisle for carrying loads to a desired storage position or for picking up loads from a storage position. The stacker usually has a mast which is vertically mounted on a roller support which moves along overhead rails in the configuration of well known stacker cranes or which is supported on the floor in the configuration of well known stacker trucks. A carriage moves vertically on the mast for positioning opposite a storage location in a rack. A carrier which is mounted on the carriage moves toward the rack whereupon the carriage is slightly lowered or slightly raised depending upon whether the operation is a storage sequence or withdrawal sequence, and then the carrier is withdrawn from the rack.

Two types of storage racks are well known. In a first type, the rack consists mainly of vertical load members with short horizontal cleats for holding pallets. In a similar device, pallets may have cleats which fit into holes on vertical members of a storage rack. In both of those cases, the stacker carrier may be configured with a shuttle platform which moves into the rack beneath a pallet and between the supporting cleats.

In the other basic type of storage rack, horizontal shelf members or beams support the pallets. Shuttle platforms cannot be used with such racks, and it is conventional to use forks for inserting into the pallets.

While shuttle platforms may be constructed for movement either to the left or to the right of the carriage, it is not as easy to mount the forks for operation on either side of the carriage. Since pallets are usually constructed with a central upright member, spaced forks must be supported at one end and must be cantilevered throughout their length for insertion into the pallet. A problem thus exists of how to support the forks at one end while being able to use the forks on either side of the aisle.

One attempt at a solution of the problem of being able to support the forks on either side of the aisle has been to use two pair of forks which are joined to each other at substantially a right angle. A pivot at the point where the forks are joined underlies a stop so that one pair of forks resting vertically against the stop supports the other pair of forks in a horizontal position for holding a load. The pair of forks which is vertically supported adds unnecessary weight to the apparatus. The forks cannot be switched from one side to another while the stacker truck is in a narrow aisle because the hypotenuse distance between tips of the forked pairs is usually wider than the aisle.

The present invention has usefulness in all stackers, and particularly those such as described in the copending patent application by Alexander Weisker, filed on Mar. 25, 1970, and titled "Materials Handling Truck Apparatus."

SUMMARY OF THE INVENTION

The broad objectives of the invention are accomplished by moving a carriage from side to side on a fork lift truck and at the same time changing the orientation of a single pair of forks from right to left, or left to right. In a preferred embodiment of the invention, a carrier is cantilevered forward from a carriage which moves up and down on a stacker mast. The carrier and carriage comprise generally planar bodies lying in perpendicular vertical planes. The end of a carrier which is near the carriage has rollers for supporting the carrier on horizontal rails which are associated with the carriage and drive means for engaging toothed elongated members on the carriage to move the carrier back and forth across the carriage.

In a preferred embodiment, forks project perpendicularly from near a bottom edge of a carrier in a direction which is generally parallel to the carriage rails. The forks are mounted for sliding movements through the carrier. Drive motors on the carrier rotate toothed wheels for engaging elongated toothed surfaces on the forks to move the forks through the carrier from one extremity to the other extremity. Conventional limit switches are provided so that the motors automatically turn off when the forks have attained their full extension. The motor means automatically lock the forks in position when they are on the desired side of the carrier so that normal handling operations of storage, retrieval, and supporting and moving loads may be performed.

In an alternate form of the invention, gears may be provided within the carrier so that the drive motor which moves the carrier along the carriage may also move the forks with respect to the carrier when it is intended to change sides with the forks. In that configuration, a clutch may prevent the interconnecting of the motor movement to the forks when the forks are loaded or when the forks and carrier are being moved in a depositing or retrieving mode.

Motion of the forks within the carrier may be provided by blocking means which may be selectively positioned at the end of the forks and locking means between the carrier and the forks which may be disengaged when the blocking means are imposed so as to permit the carrier to slide over the forks. In that form of the invention, the blocking means may be pivoted downward from their vertical stored position on a vertical carriage.

In an alternate form of the invention, the carriage may be cantilevered outward from the mast in a generally horizontal plane and the carrier may be supported above or below the carriage with the forks supported in the carrier. The vertical embodiment of the carriage is especially useful since it permits the forks to be positioned very close to the floor so that pallets which are resting on the floor may be picked up by the equipment.

In an alternate form of the invention, a single pair of forks are attached to a rotatable bar at one end of the forks. The bar is cantilevered from a carrier which moves along a carriage, and portions of the carrier may be cantilevered beneath the bar to support the bar. When the forks are changed from one sense of direction to the opposite sense of direction, the bar is rotated 180°. Rotating of the bar may be accomplished by a motor and gear. Alternatively, the bar is fitted at one end with a gear, or at least a semicircular toothed portion, which is dragged across a rack section centrally fixed on the carriage as the carrier is moved therealong to turn the forks from a right to a left hand position, or vice versa. In the normal storing and retrieving movement of the carrier on the carriage, the rack may be depressed so as not to engage the gear on the fork shaft, or the gear may be uncoupled from the shaft so that the forks remain in position during the left and right movements of the carriage.

One objective of the invention is the provision of a fork arrangement for a side loading stacker wherein a single pair of forks may be reversed to handle loads on either side of a stacker.

Another object of the invention is the provision of forks which reciprocate through a carrier as a carrier changes position on a carriage on a stacker.

Another object of the invention is the provision of a stacker attachment for a device having a vertical mast which may move in aisles between parallel racks in a warehouse.

Another object of the invention is the provision of a side loading stacker attachment for a materials handling truck.

The foregoing and other objects and features of the invention will be apparent from the specification which includes the claims and from the drawings.

BRIEF DESCRIPTION OF THE DRAWINGS

FIG. 2 is a top elevation of the stacker attachment shown in FIG. 1.

FIGS. 3A, B and C are details of steps in changing directions of forks.

FIG. 4 is a perspective schematic view of the operation of the forks and carrier.

FIG. 5 is a schematic detail of fork operators.

DETAILED DESCRIPTION OF THE DRAWINGS

Figure 1:
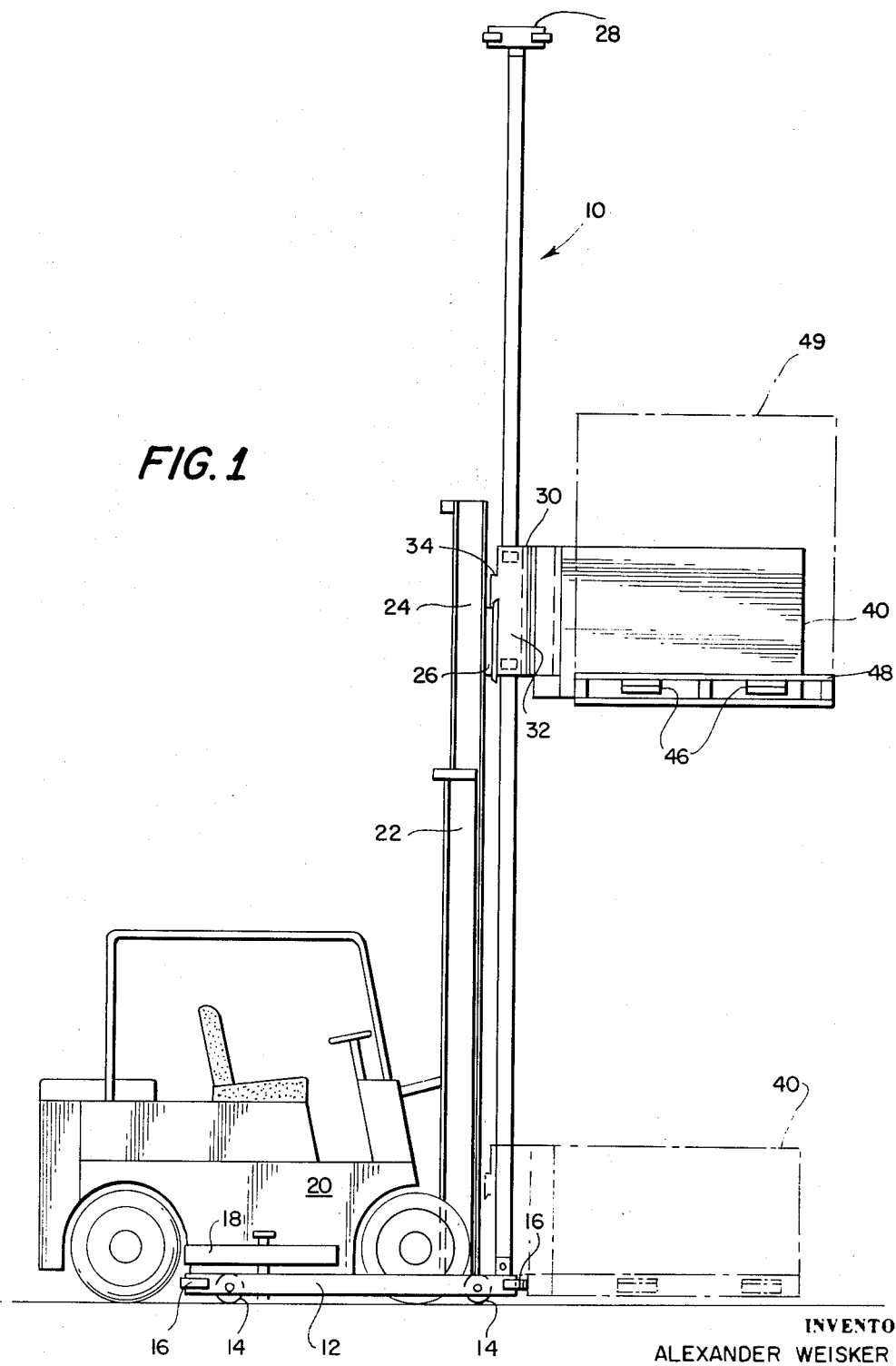
FIG. 1 is a side elevation of a side loading stacker of the present invention.

Referring to FIG. 1, a vertical mast means is generally indicated by the numeral 10. Mast means 10 may be a mast of a stacker crane. In the present case, mast 10 is supported on a base 12 which is connected perpendicularly at a lower end of mast 10. Rollers 14 near extremities of the base are mounted on horizontal axles for supporting the stacker attachment on a floor. Rollers 16 are mounted on vertical axles at corners of the base for engaging lower horizontal stringers on racks to guide the attachment in a warehouse aisle. Locking mechanism 18 connects parallel members of base 12 to opposite sides of a material handling lift truck 20.

Telescoping mast 22 on lift truck 20 has inner mast beams 24 which support a lift truck carriage for movement along the mast beams. In a well known manner, the telescoping mast 22 is extended by a hydraulic ram, and the lift truck carriage is connected to the ram by a chain and pulley arrangement so that the carriage travels over a greater distance than the mast extensions. Alternatively, the carriage may be driven independently of the mast extension.

In the embodiment shown in FIG. 1, a side loader carriage 30 is connected to lift truck carriage 26 for movement along mast 10 as controlled by the movement of carriage 26. Mast 10 is strengthened and supported by the interconnection between the lift truck carriage 26 and the side loader carriage 30, and the mast is further supported by upper guide roller assembly 28 at the top of mast 10.

As best shown with reference to FIGS. 1 and 2, carriage 30 has rearward extending sides 32 which terminate in inward extending hooks 34 which engage truck carriage 26.

Torsional stresses caused by the cantilevered load are borne by lift truck mast 22 and stacker mast 10. Primarily, the forward rotational loads are supported by the stacker mast with its parallel I-beams with fore and aft oriented webs, and side loads such as caused by a carrier and load extended to one side are supported primarily by the parallel I-beams of mast 10 with the webs oriented perpendicularly to the webs of I-beams in the truck mast.

Rollers 36 in side wall 32 of stacker carriage 30 support the side thrusts of the carriage and guide the carriage smoothly along mast 10. Similar rollers may be positioned forward and rearward of mast 10 to support forward rotational loads.

Carriage 30 has horizontal rails 38 which are I-beams having horizontal webs and vertical flanges 39.

Side loader carrier 40 is cantilevered forward from carriage 30 by supporting the carrier on rollers 42 which bear against the inside of flanges 39 on horizontal rail means 38, which, as shown in the drawing, are substantially "I" beams having horizontal webs and vertical flanges 39. Horizontally mounted rollers 44 bear against edges of flanges 39. Load engaging forks 46 are mounted in carrier 40 for picking up pallets 48 with loads 49. As shown in FIG. 2, lower guide rollers 16 on base 12 of the stacker assembly engage lower guide rails 52 which are connected near the bottom of racks 50. Upright 54 in the rack system are interconnected by horizontal members 56 which support the pallet and its load. As shown in phantom lines, when carrier 40 is moved laterally on carriage 30, forks 46 carry load 49 into the rack system 50. Slightly lowering carriage 30 disengages the forks from the pallet so that they may be withdrawn by moving carrier 40 across carriage 30.

FIGS. 3A, B and C show steps in the changing of positions of forks 46 with respect to carrier 40 so that storage racks on either side of an aisle may be serviced by the stacker.

In FIG. 3A, carrier 40 and forks 46 are interconnected for transferring loads to and from positions located in the direction of arrow 60. Drive motor 62, which is preferably a hydraulic motor, and sprocket 64 drive an elongated toothed surface fixed to fork 46. As carrier 40 is driven in the direction of arrow 60 on carriage 30, fork 46 is driven in the opposite direction with respect to carrier 40 by motor 62 and sprocket 64. Idler sprockets 66 maintain contact of the drive sprocket 64 and the toothed surface on fork 46.

As shown in FIG. 3B, carrier 40 continues to move in the direction of arrow 68 while forks 46 are moved with respect to carrier 40 in the direction arrow 69. In FIG. 3C, carrier 40 has reached its extreme position, and the forks have been extended from the carrier in the direction of arrow 70. The fork driving motor is disengaged, and carrier 40 is locked to forks 46 which are ready for operation to deposit and pick up loads in the direction of arrow 70.

As shown schematically in FIG. 4, carriage 30 may be configured with mounts 72 for supporting the carriage in vertically sliding relationship on a mast of a stacker crane. Openings 74 receive rollers 44 and internal rollers which are connected to carrier 40 to cantilever carrier 40 forward from the carriage. Motor 76 turns sprocket 78 for moving carrier assembly 40 on fixed chain 80 which is anchored at opposite ends in a horizontal attitude within the carriage 30. Chain take-up 82 provides adjustment of the chain, and forks 46 are made up of two parallel spaced portions 84 with chain 86 positioned therebetween. Opposite ends of chain 86 are fixed in blocks 88 in which chain take-ups 89 are anchored.

Figure 6:
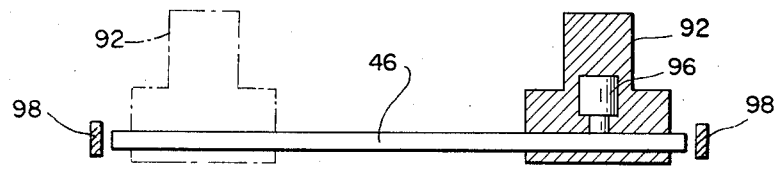
FIG. 6 is a schematic detail of an alternate method of changing fork direction.

FIG. 5 is a perspective detail showing a fork 46 in a transitory position of directional change. Motor 62 and idler shafts 90 are mounted within the carrier body. In the detail shown in FIG. 6, carrier 92 slidably supports fork 94. Locking device 96 locks the forks within the carrier. When the device is unlocked, blocks 98 may be positioned at the ends of the fork to prevent movement of the fork when carrier 92 is shifted. When carrier 92 reaches the end of its travel, lock 96 engages fork 94 and blocks 98 are removed. In that configuration, shown in phantom lines, the apparatus is ready for side loading in the opposite sense of direction.

Figure 7:
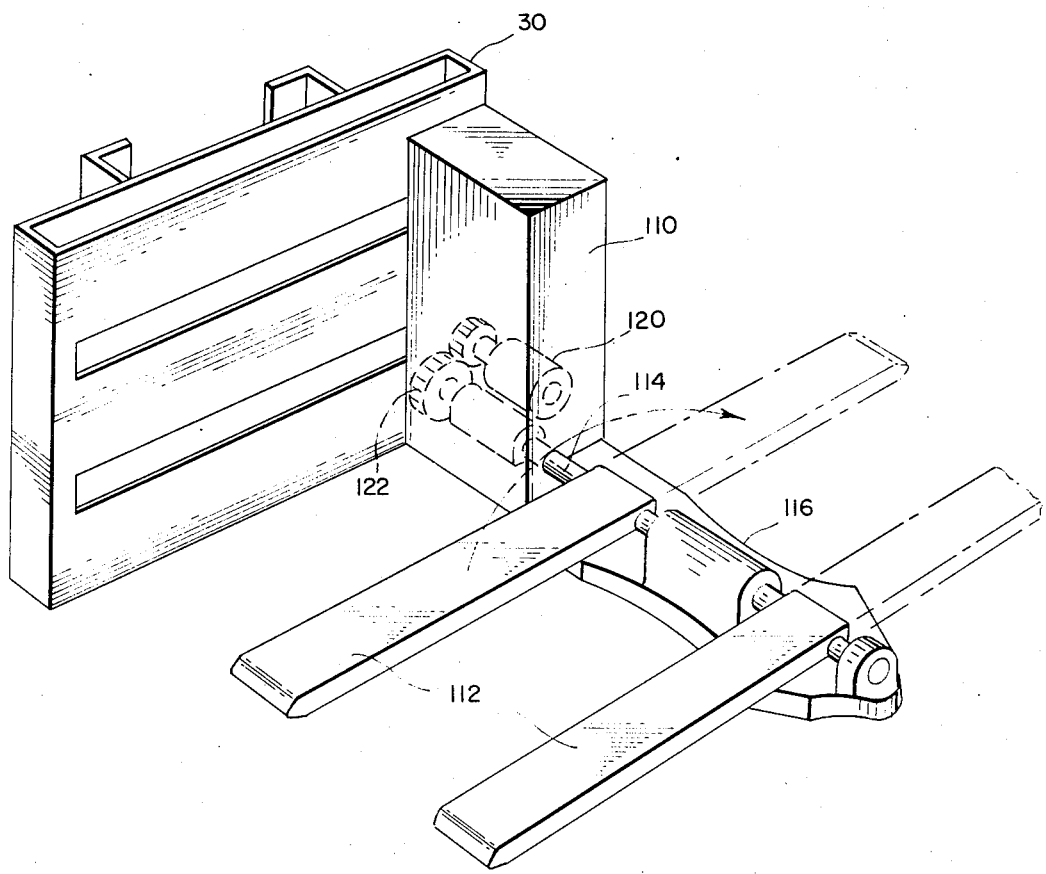
FIG. 7 is a schematic detail of an alternate form of changing fork direction.

In FIG. 7, carrier 110 is cantilevered from carriage 30. Within the body of carrier 110 is a motor with a sprocket for driving the carrier along the carriage. Forks 112 are mounted on a rod 114 which is supported on outward extension 116 of the carrier. When carrier 110 is centered, motor 120 may drive gear 122 which is attached to the end of shaft 114 to position forks 112 as shown in phantom lines. Preferably, the turning of the forks from one position to the other is accomplished over the duration of movement of carrier 110 from one extreme to the other extreme position on carriage 30. The speed of motor 120 and the reduction of its attached gears are coordinated to complete the turning of the forks just as carrier 110 reaches the end of its movement.

While the invention has been particularly shown and described with reference to a preferred embodiment thereof, it will be understood by those skilled in the art that various changes in form and details may be made therein without departing from the spirit and scope of the invention.

What is claimed is:

1. Material handling apparatus comprising a support configured for load supporting movement, the support including a mast, a generally rectangular carriage mounted for vertical movement along the mast, generally horizontal rail means mounted on the carriage, an elongated tooth engaging means mounted on the carriage adjacent the rail means, and a generally rectangular carrier oriented substantially perpendicular to the carriage, sliding means connected to the carrier adjacent the carriage for supporting the carrier on the rail means of the carriage for reciprocal movement thereon in lateral directions across the carriage, parallel load-supporting forks extending through the carrier in a direction perpendicular to the carrier and parallel to the carriage, the forks having first ends connected to the carrier and having opposite ends cantilevered therefrom, the forks being mounted on the carrier for reciprocal movement with respect thereto, whereby the forks extend from the carrier in either of opposite lateral directions, and means connected to the carriage, to the to the carrier and to the forks for driving the carrier with respect to the carriage and the forks with respect to the carrier in generally parallel directions wherein the carrier is connected normally to the forks for controlled relative movement with respect to the forks and for locking with respect to the forks, whereby movement of one of the carrier means and the forks is effected without substantial movement of the other of said carrier and the forks in an unlocked condition to change direction of the forks extension from the carrier, and movement of the carrier is imparted to the forks in a locked condition.

2. The apparatus of claim 1 wherein the support means comprises generally vertical oriented mast means and wherein the carriage means is mounted for vertical movement along the mast means.

3. The apparatus of claim 2 wherein the mast means is supported on an overhead support which is configured for movement along overhead rails.

4. The apparatus of claim 2 wherein the mast is connected to a lift truck.

5. The apparatus of claim 2 wherein the mast is connected to a lift truck mast.

6. The apparatus of claim 2 wherein the support further comprises a horizontal base connected at a lower end of the mast the base having two spaced parallel members, and guide rollers mounted on vertical axles positioned in outer extremities of the base, the guide rollers extending outward from the base for engaging vertical surfaces adjacent the base.

7. The apparatus of claim 6 wherein the base further comprises support rollers mounted on horizontal axles adjacent extremities of the base.

8. The apparatus of claim 6 wherein the base further comprises locking means mounted on ends of the parallel members remote from the mast for attaching the base to a lift truck.

9. The apparatus of claim 1 wherein the forks further comprise elongated tooth engaging surfaces and wherein the means for driving comprises a first rotary motor mounted on the carrier adjacent the carriage and having a shaft extending toward the carriage and a toothed drive wheel mounted thereon and engaging the tooth engaging surface adjacent the rail means, and second motor means mounted on the carrier adjacent the fork and having second shaft means extending toward the fork and second toothed wheel means mounted on the shaft means for engaging the tooth engaging surfaces on the forks for driving the forks back and forth through the carrier upon operation of the second motor means.

10. The apparatus of claim 9 wherein the tooth engaging surfaces comprise flexible chains fixed at opposite ends and wherein the toothed wheels comprise drive sprockets connected to the chain.

11. The apparatus of claim 10 further comprising idler sprockets mounted on idler shafts parallel to the drive shafts for maintaining the chain in driving relationship with the drive sprockets.

12. The apparatus of claim 1 wherein the forks comprise parallel sections joined at opposite ends and defining an open space therebetween, and wherein a chain is disposed in the open space and is anchored at opposite interconnected ends of the fork, and wherein a drive sprocket and adjacent parallel idler sprockets engage the chain for driving the fork back and forth in respect to the sprockets.

13. The apparatus of claim 1 wherein the load engaging forks are mounted in the carrier for reciprocal movement through the carrier.

14. The apparatus of claim 13 wherein the load engaging forks comprise a fork having parallel horizontal tines which are movable through the carrier.

15. The apparatus of claim 14 wherein the tines are individually mounted within the carrier.

16. Material handling apparatus comprising support means configured for load supporting movement, a carriage means connected to the support means, a crosshead connected to the carriage means for reciprocal movement thereon, parallel load-engaging forks connected to the crosshead for reciprocal movement with respect thereto, and power means connected to the carriage means, to the carrier and to the load-engaging forks for driving the carrier with respect to the carriage means and the load engaging forks with respect to the crosshead in generally parallel directions, the crosshead being connected normally to the forks for controlled relative sliding movement along the forks and for locking with respect to the forks whereby movement of the crosshead is effected without substantial movement of the forks in a first condition and movement of the crosshead is imparted to the forks in a second condition.

17. The apparatus of claim 16 wherein the crosshead is cantilevered outward from the carriage and is supported thereon on generally horizontal rail means connected to the carriage.

* * * * *